No. 764,316. PATENTED JULY 5, 1904.
J. & W. R. THOMAS.
MILLING CHUCK.
APPLICATION FILED JAN. 13, 1904.
NO MODEL.
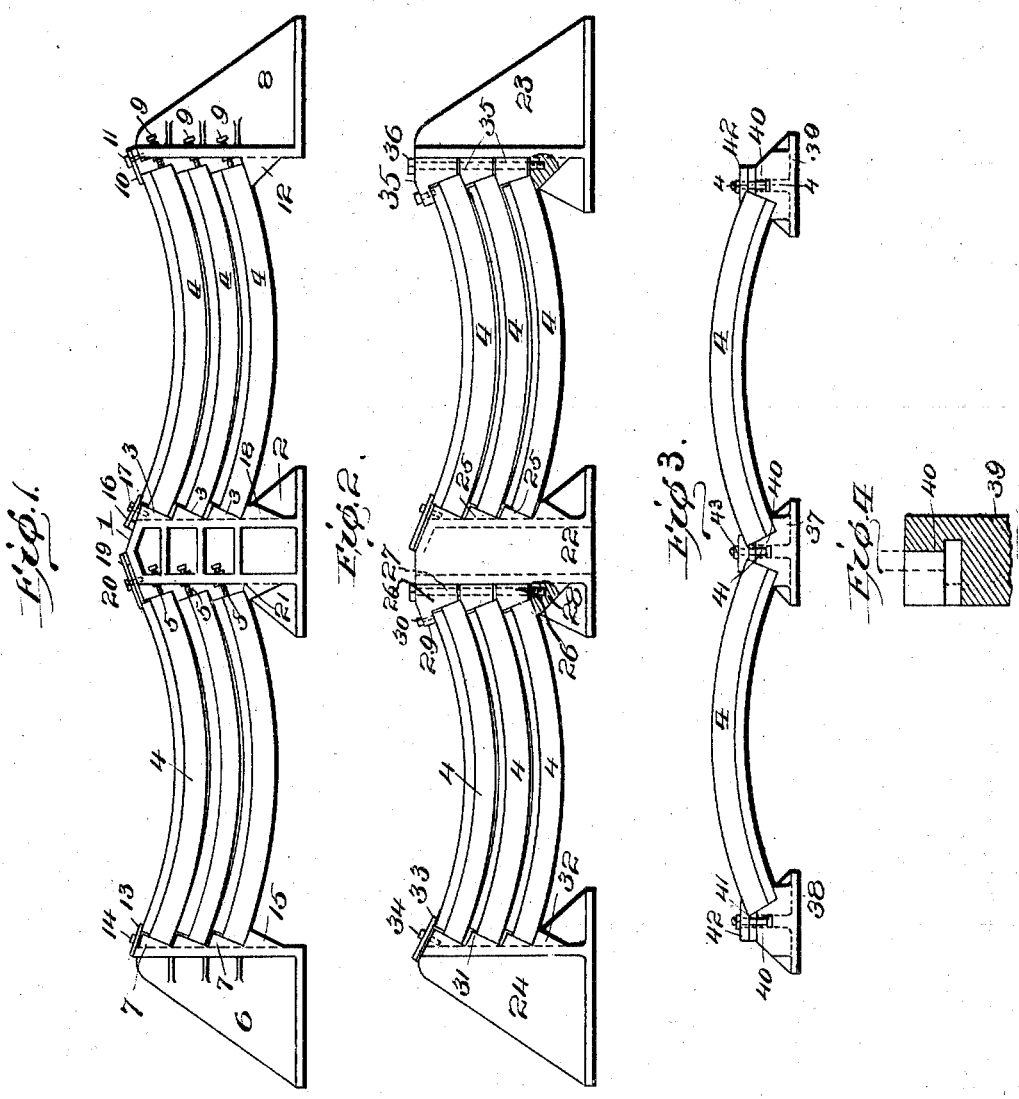

No. 764,316. Patented July 5, 1904.

UNITED STATES PATENT OFFICE.

JAMES THOMAS AND WILLIAM R. THOMAS, OF CATASAUQUA, PENNSYLVANIA.

MILLING-CHUCK.

SPECIFICATION forming part of Letters Patent No. 764,316, dated July 5, 1904.

Application filed January 13, 1904. Serial No. 188,864. (No model.)

*To all whom it may concern:*

Be it known that we, JAMES THOMAS and WILLIAM R. THOMAS, citizens of the United States, residing at Catasauqua, in the county of Lehigh and State of Pennsylvania, have invented certain new and useful Improvements in Milling-Chucks; and we do hereby declare the following to be a full, clear, and exact description of the invention, such as will enable others skilled in the art to which it appertains to make and use the same.

The present invention relates to improvements in supports, and particularly to such as are adapted for retaining articles in a given position while such articles are being subjected to machining operations.

The invention comprises chucking-heads spaced apart and means carried by each of said heads for clamping an article to be machined in position between the heads.

The invention also comprises certain other novel constructions, combinations, and arrangements of parts, as will be hereinafter fully described and claimed.

In the accompanying drawings, Figure 1 represents a view in side elevation of a plurality of chucking-heads embodying the features of the present invention, parts being broken away. Fig. 2 represents a similar view of a slightly-modified form of the same, parts being broken away. Fig. 3 represents a similar view of a further modification. Fig. 4 represents a transverse vertical section taken on the plane of line 4 4 of Fig. 3.

The present improved structure is especially adapted for use in retaining in position a segment or a plurality of segments of a tunnel-lining, the retaining means being in operation positioned upon the table or platen of a milling or planing machine.

Referring to the drawings by numerals, 1 indicates a central chucking-head, consisting of a hollow standard supported upon a suitable base 2 and carrying at one edge a series of projections 3 3, producing a plurality of inclined surfaces designed to snugly receive the end of the articles 4, which are to be operated upon, said articles 4 in the present instance consisting of the segments of tunnel-lining. The opposite wall of the standard 1 from that carrying the projections 3 is penetrated by clamping-bolts 5 5, threaded through said wall and agreeing in number with the number of said inclined surfaces.

Spaced at one side from the standard 1 a distance equal to the length of one of the segments 4 is a chucking-head 6, provided with projections 7 7, each formed with an inclined surface adapted to receive the end of one of the segments 4 opposite that engaged by one of the clamping-bolts 5. Spaced from the opposite side of standard 1 is a chucking-head 8, penetrated by a plurality of clamping-bolts 9 9, designed to engage the ends of segments 4 opposite those engaging the projections 3. A clamping-plate 10 is arranged in an inclined plane and secured to head 8 by a bolt 11, said plate being designed to engage the uppermost of the segments 4 for pressing the same downwardly and clamping the series of segments against an inwardly-projecting shoulder 12, formed on said head 8. The head 6 is similarly provided with a clamping-plate 13, designed to be tightened by means of a bolt 14 for pressing the segments 4 downwardly for clamping the same together by forcing the lowermost segment against an inwardly-extending projection 15.

The upper end of the standard 1 is provided with oppositely-inclined surfaces, one of which carries a clamping-plate 16, designed to be tightened by means of a bolt 17, for pressing the uppermost segment 4 downwardly and compressing the lowermost of said segments against a projection 18, extending from said standard 1. A clamping-plate 19 is carried by the opposite incline of the upper end of the standard 1, and said plate is designed to be tightened by means of a bolt 20 for clamping the segments 4 together and compressing the lowermost thereof against a projection 21, extending from the edge of said standard 1.

In operation the heads 1, 6, and 8 are secured to the bed or platen of a milling or planing machine spaced apart a required distance, and the segments 4 are positioned as indicated, the bolts 5 5 and 9 9 being tightened, and the clamps 10, 13, 16, and 20 being also tightened for retaining the segment 4 in position. It will be seen that by the arrangement described the two sets of segments may be operated upon at one time and both faces of each set may be machined without removal of the segments.

In Fig. 2 we have illustrated a slight modification of the present improved structure, which structure consists of a central head 22 and a head 23, spaced from one side thereof, and a head 24, spaced from the other side thereof. One side of the head 22 is provided with projections 25, similar to projections 3, and the opposite side thereof is provided with vertically-movable clamping-blocks 26 26, each formed with an inclined outer face adapted to engage one end of a segment 4. A bolt 27 extends through all of the blocks 26 and is threaded into a projection 28 on the head 22. The projection 28 also serves as a support for the segments 4. The uppermost block 26 is provided with a projection 29, extending from the uppermost segment 4 and carrying a clamping-bolt 30. The set of segments 4, engaging the blocks 26 at one end, at the opposite end engage the inclined faces of projections 31, similar in operation, arrangement, and construction to the projections 7, said segments resting upon a projection 32, similar to projection 15, and being clamped in position by a clamping-plate 33, actuated by a bolt 34. A set of segments 4, which engage at one end the projections 25, at their opposite ends engage blocks 35 35, vertically movable and controlled by bolts 36 in a manner exactly similar to the construction and arrangement of blocks 26 and bolt 27.

The modified structure illustrated in Fig. 2 is adapted for application to a machine-table and for operation in a manner similar to that above described with respect to the showing in Fig. 1.

In Fig. 3 we have illustrated a further modification which consists of a central chucking-head 37 and side chucking-heads 38 and 39 spaced therefrom. Each of the heads 37, 38, and 39 is recessed and formed with an internal shoulder 40. A bolt 41 lies within the recess of each head 37 and penetrates a clamping-plate 42, each plate 42 being of the proper construction for engaging the end of a section of tunnel-lining 4. The head of each bolt 41 engages shoulder 40, and upon the opposite end of said bolt is threaded a nut 43 for locking the respective clamping-plate 42 in position.

Having thus fully described our invention, what we claim as new, and desire to secure by Letters Patent, is—

1. A support comprising chucking-heads spaced apart, a plurality of inclined surfaces being formed on one of said heads, a shoulder being formed at the upper end of each of said surfaces, each adapted to support an article in contact with the next higher inclined surface, and clamping means carried by the other of said heads opposite each of said surfaces.

2. A support comprising chucking-heads spaced apart, a plurality of inclined surfaces being formed on one of said heads, a shoulder being formed at the upper end of each of said inclined surfaces, each adapted for supporting an article in contact with the next higher inclined surface, clamping means carried by the other of said heads, and a vertically-movable clamping-plate carried by the upper end of each of said heads.

3. A support comprising a central chucking-head formed with an inclined surface on one edge and a clamping-bolt on the other, a chucking-head spaced from the side of the central chucking-head having said clamping-bolt and having a clamping-surface, a chucking-head spaced from the other side of said central chucking-head, and a clamping-bolt carried by said last-mentioned head.

4. A support comprising a central chucking-head, a chucking-head spaced from one side thereof, clamping means carried by said last-mentioned head, complementary, clamping means carried by said central chucking-head, a chucking-head spaced from the central chucking-head on the opposite side from the second-mentioned chucking-head, clamping means carried by said last-mentioned chucking-head, and complementary, clamping means carried by said central chucking-head.

5. A support comprising a chucking-head, a plurality of superposed clamping-blocks carried thereby, a bolt engaging said blocks for producing a clamping action on the same, a chucking-head spaced from said first-mentioned chucking-head, and complementary clamping means carried thereby.

6. A support comprising a chucking-head, a projection extending therefrom, a bolt threaded into said projection, a plurality of superposed clamping-blocks carried by said bolt, a projection extending from the uppermost of said blocks, a clamping-bolt extending through said projection, and complementary clamping means spaced from said head.

7. A support comprising a central chucking-head formed with a plurality of inclined surfaces at one side, a shoulder being formed at the upper end of each of said surfaces, each shoulder being adapted to support an article in contact with the next higher inclined surface, a plurality of clamping means carried by the opposite side of said chucking-head, a chucking-head spaced at one side of the central chucking-head, clamping means on said last-mentioned chucking-head corresponding in number and position to said inclined surfaces, and a chucking-head spaced at the other side of said central chucking-head and formed with a plurality of inclined surfaces positioned and corresponding in number with the said clamping means of the central chucking-head.

In testimony whereof we hereunto affix our signatures in presence of two witnesses.

JAMES THOMAS.
WILLIAM R. THOMAS.

Witnesses:
CHARLES R. HORN,
AUSTIN A. GLICK.